(12) United States Patent
Dilkie et al.

(10) Patent No.: US 10,237,401 B2
(45) Date of Patent: Mar. 19, 2019

(54) SECURE CALL RECORDING SYSTEM FOR IP TELEPHONY

(75) Inventors: Ramon Jonathan Lee Dilkie, Stittsville (CA); Tom Quan, Nepean (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 87 days.

(21) Appl. No.: 11/890,887

(22) Filed: Aug. 8, 2007

(65) Prior Publication Data

US 2009/0041207 A1 Feb. 12, 2009

(51) Int. Cl.
*H04M 1/64* (2006.01)
*H04M 3/42* (2006.01)
*H04L 29/06* (2006.01)
H04M 3/51 (2006.01)
H04M 7/00 (2006.01)

(52) U.S. Cl.
CPC .... *H04M 3/42221* (2013.01); *H04L 65/1083* (2013.01); *H04M 3/5175* (2013.01); *H04M 7/006* (2013.01)

(58) Field of Classification Search
CPC .......... H04L 65/1083; H04M 3/42221; H04M 3/5175; H04M 7/006
See application file for complete search history.

(56) References Cited

U.S. PATENT DOCUMENTS

| 6,449,260 | B1* | 9/2002 | Sassin | H04M 3/51 370/270 |
| 6,775,277 | B1* | 8/2004 | Li | H04L 29/06 370/389 |
| 6,937,713 | B1* | 8/2005 | Kung | H04M 3/54 379/199 |
| 7,110,391 | B1* | 9/2006 | Rogers | H04L 29/06027 370/352 |
| 7,792,019 | B1* | 9/2010 | Ger | H04M 3/58 370/228 |
| 2003/0165136 | A1* | 9/2003 | Cornelius | H04L 29/06027 370/356 |
| 2005/0008005 | A1* | 1/2005 | Li | H04L 29/06 370/352 |
| 2005/0018622 | A1 | 1/2005 | Halbraich et al. | |
| 2006/0047518 | A1 | 3/2006 | Claudatos | |
| 2006/0098624 | A1* | 5/2006 | Morgan et al. | 370/352 |
| 2006/0101098 | A1* | 5/2006 | Morgan | H04L 29/06027 |
| 2007/0019622 | A1* | 1/2007 | Alt et al. | 370/352 |
| 2007/0091848 | A1* | 4/2007 | Karia | H04L 29/06027 370/331 |
| 2007/0206735 | A1* | 9/2007 | Silver | H04L 12/66 379/88.19 |
| 2008/0063167 | A1* | 3/2008 | Rao | G06Q 10/0631 379/142.13 |

FOREIGN PATENT DOCUMENTS

GB 2389736 * 12/2003
GB 2389736 A 12/2003

* cited by examiner

*Primary Examiner* — Saleh Najjar
*Assistant Examiner* — Devin E Almeida

(57) ABSTRACT

A system for recording voice calls, comprising a plurality of endpoints, a call controller for establishing call connections between the endpoints, a storage element, and a middlebox for storing and forwarding call control packets and voice packets between the endpoints and call controller, and intercepting and forwarding predetermined voice packets to the storage element for archiving.

37 Claims, 2 Drawing Sheets

SECURE CALL RECORDING SYSTEM FOR IP TELEPHONY

BACKGROUND

1. Field

The present specification relates generally to IP telephony, and more particularly to recording of voice conversations in IP telephony.

2. Description of the Related Art

There are transactions in enterprise, professional and other business contexts that give rise to a need to record telephone calls. A typical example of this requirement is the recording of calls to and from agents in a call center. For management purposes, calls to and from an agent may be recorded for later review by supervisory personnel to assess courtesy, sales effectiveness and productivity of agents. The recordings can either be triggered automatically by a management program, or manually by a human supervisor.

Another example is the recording of a confirmation by a customer of an order placed via a call center where the agent informs the customer that a verbal confirmation of the order is required and triggers a recording to memorialize the confirmation. In this case, the agent manually starts and stops the recording, which is thereafter archived along with other information relating to the transaction.

Further examples include professionals such as architects, lawyers, etc., who may wish to archive complete or partial telephone calls with clients or others. For example, an architect may wish to memorialize special instructions from a client that will entail extra costs on a project.

These call recordings are generic and easily managed in conventional voice communication systems. However, IP systems differ from conventional voice systems in that control and voice switching are distributed such that there may be no central monitoring location for recording purposes, and the use of end-to-end encryption of voice and control packets over the Ethernet or Internet requires special adaptation of the recording equipment used to record calls.

Also, call recording equipment must occasionally be retrofitted into existing IP telephony equipment. However, it is often costly and otherwise undesirable to make changes to the existing equipment for the purpose of enabling call recorder operation.

SUMMARY

According to an aspect of this specification, source and destination end points are provided with the address (e.g. IP address and port) of a middlebox rather than each other's address. The middle box is provided with the identity of each of the end points 1 (e.g. IP address and port), that are matched in each voice stream to be recorded. According to one embodiment, the middlebox may also be provided with information concerning encryption of voice streams between the endpoints. According to an exemplary embodiment, the middlebox performs a store-and-forward operation to move packets between the end points, and also intercepts packets from each stream, decrypts the packets (if encrypted), re-encrypt the packets according to a security policy established between the middlebox and call recorder, and forwards the packets to a call recording peripheral.

A more extensive discussion of the prior art, and additional details of solutions to the problems set forth above are provided hereinafter, reference being had to the accompanying drawings, wherein like numerals refer to like parts throughout.

DESCRIPTION OF THE PRIOR ART AND AN EXEMPLARY EMBODIMENT

Figure 1:
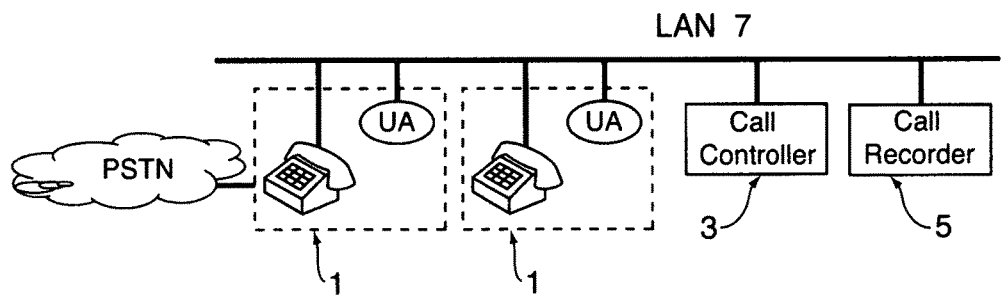
FIG. 1 is a block diagram of an IP communication system having a call recording application according to the prior art.

FIG. 1 illustrates the structure of a call recording application on an IP switch as known from the prior art. The system contains of a plurality of end points 1 (e.g. IP-enabled sets and trunks), a call controller 3 (commonly referred to as a PBX or IP PBX) and a call recorder 5. A person of skill in the art will appreciate that the call controller 3 can also be a SIP proxy, a SIP back-to-back user agent (B2BUA), or a H.323 gatekeeper. The trunks provide connectivity to the PSTN and the IP-enabled sets provide service office desktops, call center agents, etc. The end points 1 are interconnected by a LAN 7 (e.g. Ethernet). Each of the end points 1 contains control functionality (illustrated by the circle containing the caption UA (user agent)) and voice functionality (illustrated by the schematic representation of a telephone). Connectivity between the end points 1 is mediated by the call controller 3 and the various User Agents via negotiation of control packets over the LAN 7. Although some protocols allow for true end-to-end negotiation, in the practical arrangement of FIG. 1 control negotiation is mediated by call controller 3 running PBX or key system call control software that permits feature operation. Voice connectivity is provided by a specialized protocol, (e.g. RTP).

Since the system depicted in FIG. 1 is isolated with respect to the broader WAN/Internet, encryption is not required and typically is not provided on either the control or voice connections. Consequently, both control and voice streams may be transmitted "in the clear".

Figure 2:
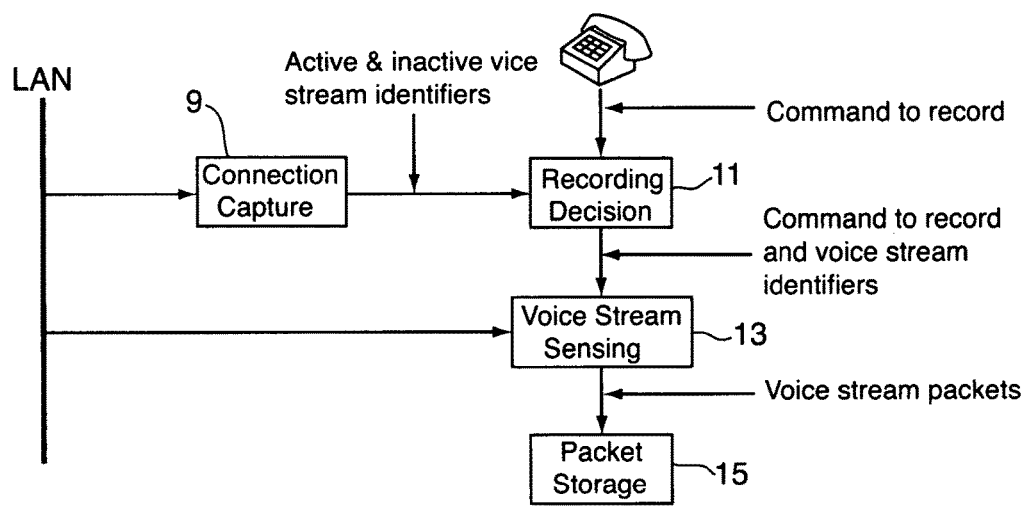
FIG. 2 is a block diagram of a call recorder according to the prior art.

Call recording is performed by an external (e.g. third party) device 5 connected to the LAN 7. Voice connections carried on the LAN 7 (e.g. according to RTP protocol) are identified by header data such as a quadruple of (1) source IP address, (2) source port, (3) destination IP address and (4) destination port. In operation, the quadruple identifies voice streams in both directions thereby permitting the recorder 5 to record a call. The call recorder contains several functions, including: connection capture 9; recording decision 11; voice stream sensing 13 and packet storage 15, as shown in FIG. 2.

The purpose of the connection capture function 9 is to determine which voice connections are currently active. This function supplies the recording decision function 11 with the identity of voice streams as they are initiated and removed. The connection capture function 9 is typically accomplished by sniffing the control stream on the LAN 7. Since the system of FIG. 1 is small, all packets are carried on the same LAN 7 and can be sensed by the connection capture function, which is aware of the protocol being used (stimulus or functional) and therefore can track the state of all connections.

The purpose of the recording decision function 11 is to decide when to start and stop recordings on individual voice streams. Decisions can either be based on a policy or on a direct command.

For the call centre application described above, since each individual agent is identified by the IP address of the telephone that he/she is using, the recording decision function 11 is supplied with the RTP stream identity (IP address and port) of all newly established and removed voice connections. These may be matched by a system policy within call controller 3 to the IP addresses of the required connections such that recordings can be initiated and terminated as needed.

Alternatively, recordings of portions of specific calls may be started or stopped (for confirmation or other purposes), in response to a command from either the supervisory position within the call centre, or the end point that specifies the IP address of the device whose voice streams are to be recorded.

The recording decision function 11 supplies the voice stream identity to be recorded to the voice stream sensing function 13.

The purpose of the voice stream sensing function 13 is to extract copies of the voice packets of a stream to be recorded and supply them to the packet storage function 15. This is accomplished by sniffing the LAN 7 for packets whose stream identity matches those that have been supplied to this function by the recording decision function 11.

The purpose of the voice packet storage function 15 is to store the packets constituting the voice streams to be recorded as indicated by the recording decision function 11.

The prior art solution described above is suitable for systems that are both small and isolated from the WAN/Internet. However, most practical installations require connection to a WAN/Internet, as illustrated in the embodiment of FIG. 3.

Figure 3:
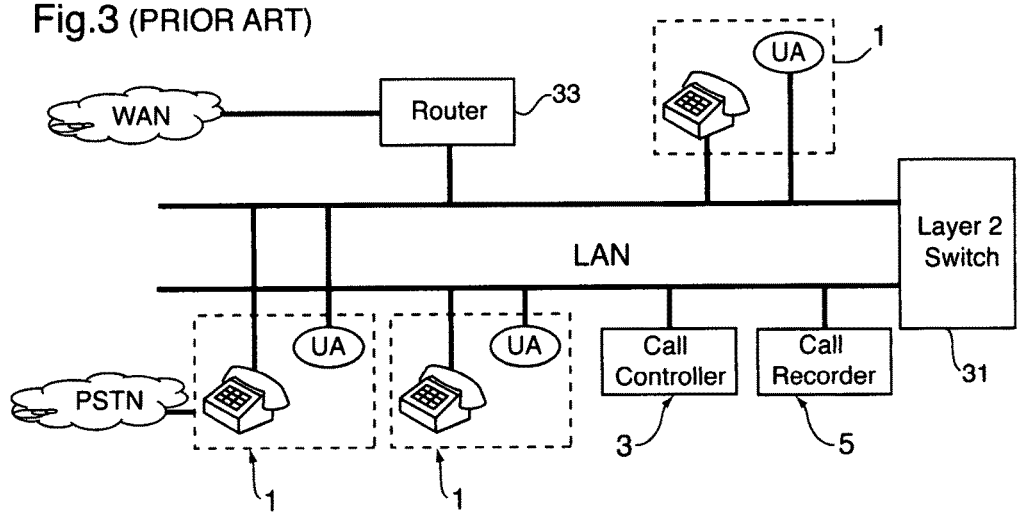
FIG. 3 is a block diagram of WAN-connected IP communication system having a call recording application according to the prior art.

The system of FIG. 3 is larger than that of FIG. 1 and therefore utilizes multiple LANs that are interconnected by a layer-2 switch or bridge 31. Also, a router 33 is provided to enable WAN-based applications. Voice and control streams are preferably encrypted to provide protection (privacy and authorization) from malicious users and applications on the WAN.

In order to facilitate call recording in the presence of encryption, it is known in the prior art to utilize a technique known as "cooperative sniffing". Connections are negotiated between the call controller 3 and the end points 1. Typically, this process begins with the mediated negotiation of a session key by a public key system. TLS (Transport Layer Security—RFC2246) is a typical example of this. By supplying the call recorder 5 with the private key of the call controller 3, it is able to sniff the session key negotiation and therefore also able to sniff both the encrypted control negotiation and the resulting voice or other media streams. Because the call recorder 5 takes part in the negotiation of the connection and is aware of the session keys for the voice stream, it can supply both the connection capture and the voice stream sensing functions 9 and 13, respectively.

Although the "cooperative sniffing" approach addresses the problem of encryption, it does not address the challenges of sniffing multiple LANs in larger systems such as shown in FIG. 3. The sharing of the private key of the call controller 3 also poses serious security concerns. If a malicious entity is able to spoof the identity of the call recorder 3, the entire functioning of the communication system can be compromised.

Figure 4:
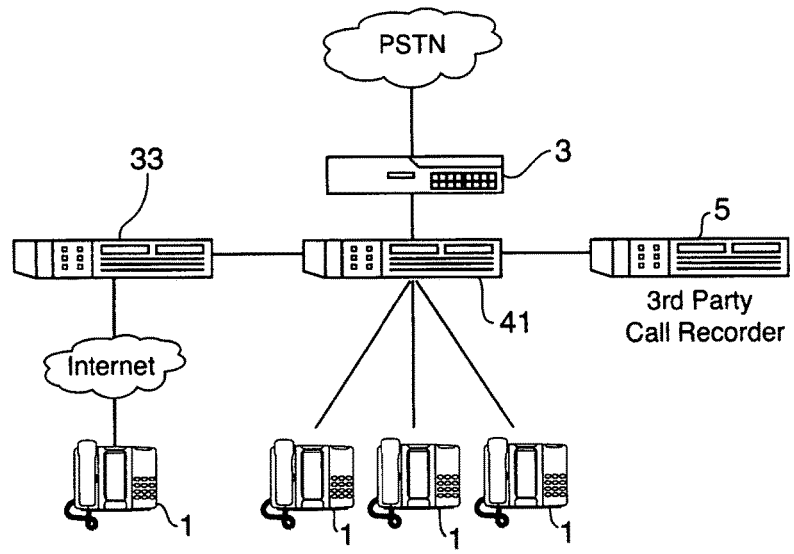
FIG. 4 is a block diagram of a call recorder system configured using a middlebox, according to an exemplary embodiment.

As shown in FIG. 4, a middlebox architecture is provided for implementing a call recorder function, while addressing the challenges of encryption and sniffing across multiple LANs. In the exemplary embodiment of FIG. 4, a middlebox 41 proxies the call controller 3 to the end points (e.g. IP phone sets) 1, and the end point 1 to the call controller 3, thereby effectively transforming the secured connection between call controller 3 and end point 1 into two terminated connections. According to the exemplary embodiment, the middlebox 41 is implemented as a dedicated server blade having an ETX (Embedded Technology eXtended) module running a standard Linux-based application.

As defined in RFC3234, a middlebox is a device on the datagram path between a source and destination that performs other functions than simply IP packet routing. The IETF MIDCOM working group has defined a framework [RFC3303], requirements [RFC3304] and protocol semantics [RFC3989] for communication between applications and middleboxes. A person of ordinary skill in the art will understand the structure and operation of middleboxes, such as firewalls, NATs (Network Address Translators), routers, etc.

According to the exemplary embodiment, middlebox 41 uses an API (e.g. a secure XML interface) for implementing a filter to specify calls that are to be recorded and, in response, selects and mirrors predetermined voice streams (either dual stream or mixed) and forwards the mirrored voice streams to call recording peripheral 5, based on configurable security policies (authentication and privacy). In the exemplary embodiment, call controller 3 performs the recording decision function 11, and call recording equipment 5 performs and the packet storage function 15, as discussed above in FIG. 2. However, the connection capture function 9 and voice stream sensing function 13 are performed within the middlebox 41, as discussed in greater detail below.

Preferably, local configuration is provided within middlebox 41 for security policies on the link to the call recording peripheral 5. Security can range from none (for compatibility with $3^{rd}$ party equipment) to highly authenticated and secure (e.g. SSL/TLS with X.509 certificates). In operation, the call recorder 5 connects and sends a registration message to the middlebox 41 via a SSL connection (client certificate presented). The middlebox 41 responds with a message indicating the current status of all connected end points 1.

More particularly, during a SSL enrollment phase the call recorder 5 generates a certificate request. The request is processed by a system administrator (e.g. a function within call controller 3), which in response issues the security certificate to the call recorder 5. During a registration phase, the call recorder 5 connects to the middlebox 41 via SSL (TCP) connection. The middlebox 41 then validates the presented certificate to complete the secure connection between middlebox 41 and call recorder 5. During runtime, the call recorder 5 requests/releases call recorder "taps" on the end point(s) 1 via the end point Directory Numbers (DNs). Thus, according to an exemplary embodiment, the call recorder 5 generates requests to the middlebox 41 to query taps, query devices, set taps and remove taps.

The middlebox 41 notifies the call recorder 5 when call connections are created or removed by the call controller 3, and notifies the call recorder 5 when voice packets start/stop for an identified call (RX and/or TX).

It will be appreciated from the foregoing that the middlebox 41 acts as a 'store-and-forward' device for control and voice packet streams within the network, and provides security associations for each of these streams (the security associations for each device in the connections can be exchanged in the same way that IP addresses and ports are exchanged). Thus, when an end point 1 negotiates a connection with call controller 3 (via its User Agent (UA)), all control packets are forwarded through the middlebox 41. Accordingly, the middlebox 41 is able to provide the connection capture function 9 discussed above in connection with FIG. 2.

As indicated previously, the prior art connection capture function suffers from several disadvantages. First, there is no mechanism specified for it to be aware of the security association and therefore the encryption keys used for connection negotiation. Second, for larger multiple LAN systems, there is no guarantee that the connection negotiation packets can be sniffed.

In the architecture set forth in FIG. 4, all connection negotiation packets are sent to or made to pass through the middlebox 41. In normal prior art operation of VoIP systems (such as shown in FIGS. 1 and 3), voice streams travel directly between the end points or end points 1, without passing through any central switching equipment. On the other hand, control packets travel between the end points 1 and the call controller 3 (e.g. a proxy or PBX). That is, the end-to-end negotiation of connections is mediated by call controller 3 running PBX or key system software, as shown in FIG. 3. As such, the call controller 3 is aware of all negotiation packets and can therefore set up security associations between itself and the end points 1 (IP telephones, trunks etc.)

In normal operation, the call controller 3 services the IP telephones 1, which are configured (by DHCP, a configuration server or other well-known means) with the IP addresses and ports assigned to respective endpoints (i.e. calling and destination IP phones 1) of a call. Each IP telephone 1 is configured with the IP address and port of the call controller 3 and the call controller 3 is configured with the IP address and port supplied to each endpoint phone 1.

According to the embodiment of FIG. 4, the communications between call controller 3 and endpoints 1 is mediated by the IP addresses supplied to them by the middlebox 41. The call controller 3 acts as a 'man-in-the-middle' for the streams of control packets. That is, middlebox 41 acts as a store-and-forward server for all control messages between the call controller 3 and the IP telephones 1. To accomplish this, the IP telephones 1 are provided with an IP address and port on the middlebox 41 that serves as the address and port of their call controller 3. Similarly the call controller 3 is provided with an IP address and port for each and every IP phone 1 that it serves. The middlebox 41 stores a table that associates the IP addresses and ports of the phones 1 that it serves with the IP addresses and ports for the phones 1 that have been supplied to the call controller 3.

In operation, the connection capture function 9 within middlebox 41 relays control messages to and from the call controller 3 and the served IP phones 1. The connection capture function 9 also interprets and modifies these messages as required to ascertain call state, and identifies messages that indicate the address and ports assigned to voice or other media streams, and modifies these as needed. In particular, the connection capture function 9 within middlebox 41 is able to extract and insert IP addresses and ports into these messages.

As a call is being set between two IP phones 1, each phone informs the call controller 3 of the IP address and port on which it will transmit and receive voice packets. The call controller 3, in turn informs each of the IP phones 1 of the address and port that the other endpoint phone 1 in the connection will expect to use. The connection capture function 9 identifies and extracts this information, modifies the messages to include idle transmit and receive ports on the voice stream sensing function 13 within middlebox 41. Each IP phone 1 involved in a connection sends voice packets to and expects to receive voice packets from the voice stream sensing function 13. The voice stream sensing function 13 has a data structure associating these addresses and ports with the ones announced by the IP phones 1 such that it functions as a store-and-forward switch for the connection. The voice stream sensing function 13 effectively acts as a relay for media streams between the phones 1.

As discussed above, according to the exemplary embodiment of FIG. 4, the recording decision function 11 operates within the call controller 3, and is supplied with policies indicating the circumstances under which a call should be recorded. Because it is implemented within the call controller 3, the recording decision function 11 is aware of calls and call states. When appropriate, the recording decision function 11 sends commands to the voice stream sensing function 13 to begin or cease recording on particular voice streams. Upon receipt of a command to record, the voice stream sensing function 13 begins to mirror the voice stream, as discussed above. That is, the voice stream sensing function 13 stores and forwards the voice streams between two endpoints of a call while also sending both voice streams to the packet storage function 15. The voice stream sensing function 13 can also command the packet storage function 15 to begin and stop recording.

In the same way, as IP addresses and ports are exchanged, the security associations for each device in the connections may be exchanged as well.

According to one alternative embodiment, the connection capture function 9 may be incorporated directly into call controller 3. In such an embodiment, during call set up negotiation, the call controller 3 provides source and destination end points 1 with the address (e.g. IP address and port) of the middlebox 41 rather than each other's address. The middle box 41 is supplied with information concerning the proper encryption of voice streams along with the identity of the end points 1 (e.g. IP address and port), that are matched in each stream. The middlebox 41 then performs a store-and-forward operation to move packets between the end points 1, and also intercepts packets from each stream that the call recorder 5 has requested be tapped, decrypts the packets, re-encrypt the packets according to the security policy established between the middlebox and call recorder, and forward the packets to the call recorder 5. Thus, in such an alternative embodiment, as with the exemplary embodiment of FIG. 4, the middlebox 41 intercepts and manipulates both voice and control streams.

Although the exemplary embodiment has been described as being implemented using a dedicated middlebox 41 to supply connection capture and voice stream sensing data for the call recorder 5, a person of skill in the art will appreciate that other middleboxes, such as a router, layer-2 switch, NAT, firewall, etc., are also capable of providing this function. Alternatively, endpoints 1 can perform the connection capture 9 function and may also be extended to provide the recording decision function 11 (e.g. by user actuation).

As indicated above in connection with the connection capture function 9, the packet storage function 15 can also be performed on the middlebox 41, or on a further middlebox that is specifically designed for this function. Alternatively, the packet storage function 15 can be included in the call control server 3.

It will be appreciated from the foregoing that the various individual call recorder functions may be physically co-located in any combination of dedicated devices and/or middleboxes 41 that provide other functions (such as the layer-2 switch 31, firewall etc.) It should also be noted that all call recorder functions can be co-located within the call controller 3. Moreover, as indicate above, voice stream sensing 13, packet storage 15, etc. may be performed within the end points 1. Thus, each individual end point 1 or (e.g. IP phone) can contain all of the functionality required for the storage of all voice sessions made to and from that end point. To implement such an embodiment, each individual end point 1 must be provided with adequate storage to retain a sufficient number of individual voice sessions.

ACD agents are typically supplied with personal computers to facilitate their interactions within a call centre. These computers may have associated telephones (or alternatively may include softphone software). The mass storage capacity of even modest personal computers now exceeds 100 gigabytes. With this type of equipment, there is no difficulty in storing many thousands of hours of voice sessions. Thus, the packet storage function 15 described above can be configured as a distributed system with each endpoint 1 storing its own voice traffic.

Although an exemplary embodiment has been described wherein a middlebox 41 captures control and data packets for the connection capture and voice stream sensing functions 9 and 13, there is no requirement that a single middlebox be used for both of these functions. Separate middleboxes may be used to capture the different streams.

Additionally, the use of multiple middleboxes for each of these functions can be beneficial in alleviating delay and congestion problems that may arise with the single middlebox implementation. Separate middleboxes can also be used to cover multiple groupings of end points 1. Since voice traffic is sensitive to congestion and delay, different numbers of middleboxes can be assigned to perform different functions to alleviate "choke points".

The many features and advantages of the invention are apparent from the detailed specification and, thus, it is intended by the appended claims to cover all such features and advantages of the invention that fall within the scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A communication system having a call controller for effecting call control between a plurality of endpoints coupled to a plurality of local area networks, and a call recorder for archiving voice calls between said endpoints, said communication system including a packet storage element for storing selected voice packets within voice streams for calls to be recorded, a recording decision element for identifying said selected voice packets, a connection capture element for detecting initiation and removal of voice calls between said endpoints, and a voice sensing element for extracting copies of said selected voice packets and supplying them to said packet storage element, the communication system further comprising:

means for proxying the call controller to the end points and the end points to the call controller thereby transforming respective connections between the call controller and end points into respective pairs of terminated connections, selecting and mirroring predetermined active voice streams to be recorded, and securely forwarding the mirrored voice streams to said packet storage element for archiving, wherein the means validates a registration request from the call recorder to establish a secure connection between the means and the call recorder and responds to the registration request with a message indicating a status of connected endpoints of the plurality of endpoints, wherein during a runtime, the call recorder requests or releases taps on the endpoints, wherein the means establishes a security policy with the call recorder, wherein the step of securely forwarding is based on the security policy, wherein the means receives control messages between the call controller and the endpoints and extracts and inserts internet protocol (IP) addresses and ports from and onto the control messages, wherein the means provides the endpoints with an IP address and a port on the means that serves as corresponding IP addresses and ports for the call controller, wherein the means provides the call controller with the IP address and the port for each endpoint, wherein the means stores a table that associates IP addresses and ports of the end points with IP addresses and ports of the end points supplied to the call controller, and wherein the means relays control messages to and from the call controller and the endpoints.

2. The communication system of claim 1, wherein said means is a router.

3. The communication system of claim 1, wherein said means is a layer-2 switch.

4. The communication system of claim 1, wherein said means is a Network Address Translator.

5. The communication system of claim 1, wherein said means is a firewall.

6. The communication system of claim 1, wherein said means is a dedicated server.

7. The communication system of claim 1, wherein said connection capture element is incorporated within said endpoints.

8. The communication system of claim 1, wherein said recording decision element is incorporated within said endpoints.

9. The communication system of claim 1, wherein said voice sensing element is incorporated within said means.

10. The communication system of claim 1, wherein said voice sensing element is incorporated within said call controller.

11. The communication system of claim 1, wherein said voice sensing element is incorporated within said endpoints.

12. The communication system of claim 1, wherein said connection capture element is incorporated within said means.

13. The communication system of claim 1, wherein said connection capture element is incorporated within said call controller.

14. The communication system of claim 1, wherein said packet storage element is incorporated within said means.

15. The communication system of claim 1, wherein said packet storage element is incorporated within said endpoints.

16. The communication system of claim 1, wherein said packet storage element is incorporated within said call controller.

17. A system for recording voice calls, comprising:
a plurality of endpoints coupled to a plurality of local area networks;
a call controller for establishing call connections for exchanging voice streams between said endpoints;
a storage element; and
a middlebox for proxying the call controller to the end points and the end points to the call controller thereby transforming respective connections between the call controller and end points into respective pairs of terminated connections, selecting and mirroring predetermined active ones of said voice streams to be recorded, and securely forwarding the mirrored voice streams to said storage element for archiving,
wherein the middlebox validates a registration request from the storage element to establish a secure connection between the middlebox and the storage element and responds to the registration request with a message indicating a status of connected endpoints of the plurality of endpoints,
wherein during a runtime, the storage element requests or releases taps on the endpoints,
wherein the middlebox establishes a security policy with the storage element,
wherein the step of securely forwarding is based on the security policy,
wherein the middlebox receives control messages between the call controller and the endpoints and extracts and inserts internet protocol (IP) addresses and ports from and onto the control messages,
wherein the middlebox provides the endpoints with an IP address and a port on the middlebox that serves as corresponding IP addresses and ports for the call controller,
wherein the middlebox provides the call controller with the IP address and the port for each endpoint,
wherein the middlebox stores a table that associates IP addresses and ports of the end points with IP addresses and ports of the end points supplied to the call controller, and
wherein the middlebox relays control messages to and from the call controller and the endpoints.

18. A method of operating a middlebox for recording calls in a communication system having a call controller for effecting call control between a plurality of endpoints coupled to a plurality of local area networks, the method comprising:
proxying the call controller to the end points and the end points to the call controller for transforming respective connections between the call controller and end points into respective pairs of terminated connections;
selecting and mirroring predetermined active voice streams to be recorded;
intercepting packets from each of the endpoints;
decrypting the packets;
re-encrypting the packets according to a security policy established between the middlebox and a call recorder,
securely forwarding the mirrored voice streams comprising the packets to a call recording peripheral for archiving;
validating a registration request from the call recorder to establish a secure connection between the middlebox and the call recorder; and
responding, using the middlebox, to the registration request with a message indicating a status of connected endpoints of the plurality of endpoints,
wherein during a runtime, the call recorder requests or releases taps on the endpoints,
wherein the middlebox receives control messages between the call controller and the endpoints and extracts and inserts internet protocol (IP) addresses and ports from and onto the control messages,
wherein the middlebox provides the endpoints with an IP address and a port on the middlebox that serves as corresponding IP addresses and ports for the call controller,
wherein the middlebox provides the call controller with the IP address and the port for each endpoint,
wherein the middlebox stores a table that associates IP addresses and ports of the end points with IP addresses and ports of the end points supplied to the call controller, and
wherein the middlebox relays control messages to and from the call controller and the endpoints.

19. The method of claim 18, further comprising encrypting said mirrored voice streams prior to forwarding to said call recording peripheral.

20. The method of claim 18, wherein said proxying further includes registering said call recording peripheral with a middlebox via a secure connection.

21. The method of claim 20, wherein said registering includes generating a certificate request within said call recording peripheral, processing said request within said call controller and in response issuing a security certificate to said call recording peripheral, transmitting said certificate from said call recording peripheral to said middlebox, and validating said certificate within said middlebox.

22. The method of claim 18, further wherein said call recording peripheral identifies said predetermined voice streams to said middlebox by issuing tap request and release commands for predetermined ones of said end points identified by respective Directory Numbers.

23. The method of claim 20, wherein said middlebox notifies the call recorder when call connections are created or removed by said call controller, and notifies said call recording peripheral when voice packets start and/or stop for respective ones of said voice streams.

24. The communication system of claim 1, wherein said respective connections are secure encrypted connections.

25. The system of claim 17, wherein said respective connections are secure encrypted connections.

26. The method of claim 18, wherein said respective connections are secure encrypted connections.

27. The communication system of claim 1, wherein said respective connections are unsecure connections.

28. The system of claim 17, wherein said respective connections are unsecure connections.

29. The method of claim 18, wherein said respective connections are unsecure connections.

30. The communication system of claim 1, wherein the call controller is a PBX.

31. The communication system of claim 1, wherein the call controller is a SIP proxy.

32. The communication system of claim 1, wherein the call controller is a SIP back-to-back user agent (B2BUA).

33. The communication system of claim 1, wherein the call controller is a H.323 gatekeeper.

34. The system of claim 17, wherein the call controller is a PBX.

35. The system of claim 17, wherein the call controller is a SIP proxy.

36. The system of claim 17, wherein the call controller is a SIP back-to-back user agent (B2BUA).

37. The system of claim 17, wherein the call controller is a H.323 gatekeeper.

* * * * *